United States Patent [19]
Kogon

[11] 3,888,831
[45] June 10, 1975

[54] CURING WITH COMPLEXES OF SELECTED DIAMINES AND ALKALI METAL SALTS

[75] Inventor: Irving Charles Kogon, Wilmington, Del.

[73] Assignee: E. I. Du Pont De Nemours & Company, Wilmington, Del.

[22] Filed: Oct. 1, 1973

[21] Appl. No.: 402,490

[52] U.S. Cl. ........ 260/77.5 AM; 252/182; 260/2 N; 260/46.5 R; 260/47 EN; 260/75 NH; 260/79.1; 260/91.5; 260/91.7; 260/92.3; 260/92.8
[51] Int. Cl. ............................................ C08g 22/00
[58] Field of Search .. 260/77.5 AM, 75 NH, 47 EN, 260/2 N, 91.5, 91.7, 92.3, 92.8 A, 79.1, 46.5 R; 252/182

[56] References Cited
UNITED STATES PATENTS

| | | | |
|---|---|---|---|
| 3,527,744 | 9/1970 | Baker et al. | 260/94.7 N |
| 3,755,261 | 8/1973 | VanGulick | 260/77.5 AM |

*Primary Examiner*—M. J. Welsh

[57] ABSTRACT

Amine-curable polymers or prepolymers are cured effectively by a curing agent which is a complex of 4,4'-methylene dianiline and/or racemic 2,3-di-(4-aminophenyl) butane and selected alkali metal salts including sodium chloride which complex is used in conjunction with a polarizable compound such as benzene, or a polar compound containing no reactive hydrogens, such as acetone.

20 Claims, No Drawings

CURING WITH COMPLEXES OF SELECTED DIAMINES AND ALKALI METAL SALTS

BACKGROUND OF THE INVENTION

The curing of amine-curable polymers, such as isocyanato-terminated polyurethane prepolymers, epoxy resins and millable halogen-containing hydrocarbon polymers, is well known. In the past, curing has generally involved mixing the amine curing agent with the curable polymer by means suitable for the materials involved and forming the mixture into a useful form, followed by a heating step to complete the curing reaction. A problem which is encountered in this prior art procedure is the premature reaction of the curing agent with the curable polymer during the mixing step and during the interval following milling until the forming operation is completed. The problem posed by the premature reaction or curing varies widely in degree for different amine curing agent/polymer systems, but must be taken into consideration in most instances. In more reactive systems such as those employing isocyanato-terminated polyurethane prepolymers the problems resulting from prereaction have previously necessitated the use of special low residence time mixers and selected diamines of reduced reactivity as curing agents.

A method for preventing this premature reaction and bringing about an outstanding cure of the various amine-curable polymers such as isocyanato-terminated polyurethane prepolymers, epoxy resins and millable halogen-containing hydrocarbon polymers is to be found in U.S. Pat. No. 3,755,261 for Norman M. Van Gulick.

In essence, curing of polymers effected with amines is thought to involve chain extension of a prepolymer or cross linking of the polymer itself. In the case of the urethane and epoxy polymers a prepolymer is generally transformed from a viscous liquid having a molecular weight of less than about 3,000 to a solid having a molecular weight in excess of 10,000. The solids range from rubbery materials to hard plastics with a wide variety of known uses, e.g., molded tires, machine parts and potting compositions. In the case of amine-curable millable gums, such as polychloroprene, the gum is converted to a cross-linked elastomer with valuable physical properties.

The previously mentioned U.S. Pat. No. 3,755,261 represents a significant improvement in the art. The cure effected, however, by the technique included therein, requires the use of somewhat elevated temperatures. There are instances wherein it is desirable to operate at lower temperatures, which can approach ambient conditions and further, there are instances when it is desirable to increase the rate of cure at elevated temperatures. Thus a need exists for a curing technique which will operate at lower temperatures or which will increase the rate of curing at elevated temperatures and still effect an outstanding cure of the polymer.

SUMMARY OF THE INVENTION

According to this invention a curing composition which will effect such a cure has been discovered. The process of effecting the cure and the cured product are also intended to be within the scope of the instant invention. The curing agent comprises a complex of 4,4'-methylene dianiline (MDA) and/or racemic 2,3-di-(4-aminophenyl) butane used in conjunction with a polar or polarizable compound which contains no reactive hydrogen. The polar compound does not serve as a curing agent but serves to accelerate and lower the temperature required for the curing effected by the MDA-salt complex. The polar compound may be selected from aromatic hydrocarbons, ketones, esters and chlorinated solvents to name a few representative examples. The most preferred polar compounds are the ketones, of which acetone is especially preferred and the esters with tetraethylene glycol bis(2-ethylhexanoate) being preferred. The polar compound, containing no reactive hydrogen as previously mentioned, is used in conjunction with the complex; the polar component makes up about 0.25 to 25% by weight of the total weight of complex and polar compound.

The polar compound and complex may be added in any order to the amine-curable polymer. On occasion, it may be desirable to mix the polar compound and complex and to add the mixture to the amine-curable polymer.

The polar or polarizable compounds include

A. compounds having dipole moments in excess of 0.4 debye in which there are no more than a total of 8 $CH_3-$, $-CH_2-$ or tertiary carbon radicals per polar group contained in the compound and B. benzene, biphenyl, 1,4-disubstituted benzenes and 4,4'-disubstituted biphenyl, wherein the substituents are selected from the group consisting of $C_1-C_4$ alkyl, $-F$, $-Cl$, $-Br$, $-C \equiv N$ and $-NO_2$. In addition, the polar compound must be free of active hydrogen and groups which would react with methylenedianiline.

The combination of the polar compound and complex may be utilized for the curing of amine-curable prepolymers or polymers; typical of these polymers are the various urethane polymers and prepolymers. Other prepolymers or polymers which may be cured with the complex of the instant invention include the following:

1. Epoxy resins such as those disclosed in the "Encyclopedia of Polymer Science and Technology" Interscience Publishers, New York (1967), Volume 6, pps. 212–221. The curing of certain epoxy resins with methylene dianiline is described in U.S. Pat. No. 2,773,048 to Formo et al. In the present process, the amine complex can be used in equivalent amounts to those suggested for the free diamine by U.S. Pat. No. 2,773,048 and the "Encylopedia of Polymer Science and Technology," Volume 6, pps. 226–230.

2. Halogen-containing hydrocarbon polymers such as chloroprene polymers, chlorinated butyl rubber and chlorinated polyethylene and polypropylene. Chloroprene polymers are described in the "Encyclopedia of Polymer Science and Technology," Volume 3, (1965), pps. 705–728. Chlorinated butyl rubber and its curing by diamines is described in British 815,939. In curing halogen-containing polymers of these types with the complex used in the instant process, it is customary to include a metal oxide acid acceptor such as zinc oxide.

The curing or cross-linking of hydrofluorinated polymers with polyamines is disclosed in U.S. Pat. No. 2,979,490 to West.

3. Chlorosulfonated polymers such as those described in U.S. Pat. No. 2,723,257 to McAlevy, which patent relates to the curing of such polymers with aromatic diamines including methylene dianiline.

4. Polymers containing acid halide groups such as

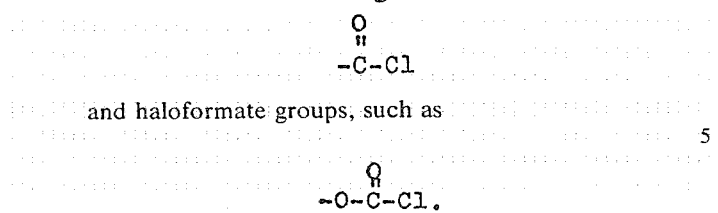

and haloformate groups, such as

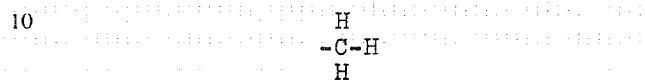

The curing of these polymers with methylene dianiline is analogous to the curing of chlorosulfonated polymers.

5. Polymers containing anhydride groups which on reaction with diamines yield amide-acid linkages.

6. Organopolysiloxanes such as described in U.S. Pat. No. 2,938,010 to Bluestein, which patent relates to the use of diamines as curing agents for organopolysiloxanes.

All patents and articles referred to above are herein incorporated by reference.

The prepolymers and/or polymers are admixed with the complexes described above and a polar compound and then cured by standard techniques.

The curing may be effected at a temperature between about 0° to 220°C., depending on the polymer being cured.

The polar compound does not participate in the cure but serves to accelerate it and enables it to commence at a lower temperature.

DETAILED DESCRIPTION

Since the urethanes (that is, prepolymers and polymers containing isocyanato groups) are typical polymers which may be cured by the process of the instant invention a more detailed description of the curing procedure with the urethanes will be included; it should be emphasized that there is no intention to limit the invention, however, to the urethanes but rather all amine-curable polymers and prepolymers of which the above-mentioned are representative are intended to be within the scope of the instant invention.

The polyurethanes are generally formed by first reacting a polyether polyol or a polyester polyol with a molar excess of an organic diisocyanate to form a prepolymer having terminal isocyanato groups. The prepolymer is then cured to increase its molecular weight from less than about 3,000 to upwards of about 10,000. Examples of such polymers are described in U.S. Pat. Nos. 2,620,516, 2,777,831, 2,843,568, 2,866,774, 2,900,368, 2,929,800, 2,948,691, 2,948,707, 3,114,735; herein incorporated by reference.

The polar compound can be selected from a large group of compounds. As previously indicated, the polar or polarizable compound must be free of active hydrogens which would react with isocyanate groups and must be free of groups, such as acyl halide groups, which would react with methylene dianiline. The polar compounds include (A) compounds having dipole moments (electric moments) in excess of 0.4 debye in which there are no more than a total of 8 $-CH_3-$, $-CH_2-$ or tertiary carbon radicals per polar radical contained in the compound and (B) benzene, biphenyl, 1,4-disubstituted benzenes and 4,4'-disubstituted biphenyls wherein the substituents are selected from the group consisting of $C_1-C_4$ alkyl, $-F$, $-Cl$, $-Br$, $-C \equiv N$, $-NO_2$.

The restriction on the compounds in (A) that not more than 8 $CH_3-$, $-CH_2-$ or tertiary carbon radicals be present per polar radical is required because compounds having larger numbers of such radicals have little effect on the rate of curing when employed in combination with the methylenedianiline : salt complexes. Compounds in which not more than 5 $CH_3-$, $-CH_2-$ or $$-\overset{H}{\underset{H}{C}}-H$$

radicals are present per polar radical are preferred because of their greater activity in the curing process.

The restriction may be better understood by applying it to several illustrative compounds. Ethyl butyrate would be included since it contains 2 $CH_3-$ radicals and 3 $-CH_2-$ radicals for one polar radical, namely the ester radical

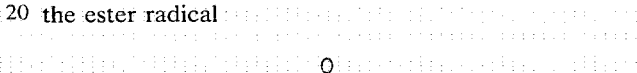

Hexyl hexanoate would not be included because it contains 2 $CH_3-$ radicals and 9 $-CH_2-$ radicals for a total of 11 for a single polar radical. Dodecyl phthalate would not be included because it contains 2 $CH_3-$ radicals and 18 $-CH_2-$ radicals for a total of 10 $CH_3-$ and $-CH_2-$ radicals per polar radical. Dihexyl phthalate would be included since it contains a total of only 6 $CH_3-$ and $-CH_2-$ radicals per carboxyl radical. Tetraethylene glycol bis-(2-ethyl-hexanote) would be included as it contains 4 $CH_3-$ radicals, 16 $-CH_2-$ radicals and 2 tertiary carbon radicals, a total of 22 against a total of 5 polar radicals, namely 3 $-O-$ radicals and 2

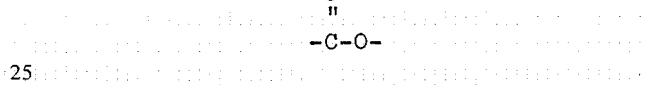

radicals.

Polar compounds having molecular weights in excess of 2,000 are effective in the curing process, but those having molecular weights below 2,000 are preferred. More preferred are compounds having a molecular weight below 1,000.

Representative classes of polar compounds include esters, ketones, ethers, halogenated hydrocarbons, tertiary amines, fully substituted amides, sulfones, sulfoxides, sulfides. Of these the esters of carboxylic acids, ketones and halogenated hydrocarbons are preferred.

Representative ketones include alkyl, aralkyl and aromatic ketones such as acetone, methyl ethyl ketone, di-butyl ketone, methyl hexyl ketone, acetophenone, benzophenone, mesityl oxide, 5-chloro-2-pentanone, cyclohexanone, ethyl levulinate and 1,4-cyclohexanedione.

Representative esters include those derived from aliphatic and aromatic mono- and polycarboxylic acids and alcohols, polyols and phenols. Illustrative compounds include ethyl acetate, butyl acetate, ethyl propionate, methyl butyrate, phenyl acetate, methyl benzoate, phenyl benzoate, dimethyl phthalate, dibutyl phthalate, dibutyl isophthalate, diphenyl phthalate, dibutyl succinate, dibutyl sebacate, diphenyl succinate, triethyl trimellitate, ethylene glycol dibenzoate, 1,3-propylene glycol dipropionate, triacetin and tetramethylene glycol bis(2-ethylhexanoate). Esters derived from cycloaliphatic acids or alcohols such as cyclohexane carboxylic acid and cyclohexanol are also included.

Halogenated hydrocarbons which may be utilized include compounds derived from aliphatic, cycloaliphatic and aromatic hydrocarbons by the substitution of one or more hydrogens by F, Cl, Br or I. Chlorinated and brominated derivatives are preferred. Representative materials include methylene chloride, ethyl bromide, dichloroethane tetrachloroethylene, cyclohexyl chloride, trichlorofluoromethane, hexachlorobenzene, chlorobenzene, fluorobenzene, bromobenzene, dichlorobenzenes, trifluoromethylbenzene, benzyl chloride, dichloronaphthalenes and chlorinated biphenyls.

Ethers which can be used include aliphatic, cycloaliphatic and aromatic compounds or mixed aliphatic-aromatic compounds. Representative are diethyl ether, diphenyl ether, 1,4-dimethoxy cyclohexane, anisole, phenetole, chlorinated diphenyl ether, dimethyl ether of diethylene glycol, and ethyl ethyoxyacetate.

Certain classes of nitrogen-containing compounds can be used. Representative are tertiary amines such as triethyl amine, N,N-dimethylcyclohexylamine, N,N-dimethyl aniline, N,N,N'N'-tetramethyl ethylene diamine, tetramethyl methylene dianiline, pyridine, N,N'-dimethylpiperazine and N-ethyl pyrrolidine. Also representative are amides of secondary amines, such as N,N-dimethyl formamide, N,N-dimethylacetamide, N,N-diethyl benzamide and N-methyl pyrrolidone, aromatic nitrocompounds such as nitrobenzene, oxime ethers such as O-ethyl acetone oxime, fully substituted ureas such as tetramethyl urea and fully substituted guanidines such as pentomethyl guanidine.

Sulfur-containing compounds such as sulfides, sulfones, sulfoxides and N,N-disubstituted sulfonamides can also be used. Of these dimethyl sulfoxide is especially preferred. Phosphorus compounds, including fully esterified phosphate and phosphonate esters, can be used as the polar compound.

The scope of the complexes has previously been discussed; the preferred complexes are those formed from MDA and the various salts.

With regard to forming the complex, it is prepared by forming a complex between 4,4'-methylene dianiline and a salt, the salt being selected from nitrites and halides, except the fluorides, of sodium and lithium and sodium cyanide or by forming a complex between racemic 2,3-di(4-aminophenyl) butane and a halide salt, except the fluoride, of sodium, potassium, rubidium and cesium. Specifically, the compositions to be utilized as curing agents for amine curable polymers include the reaction products of 4,4'-methylene dianiline with the following salts, in the ratio of 3 moles of methylene dianiline to 1 mole of salt: sodium chloride, sodium bromide, sodium iodide, sodium nitrite, lithium chloride, lithium bromide, lithium iodide, lithium nitrite and sodium cyanide, and the reaction products of racemic 2,3-di(4-aminophenyl) butane with the following salts in the ratio of 3 moles of diamine to 1 mole of salt: sodium chloride, sodium bromide, sodium iodide, potassium chloride, potassium bromide, potassium iodide, rubidium chloride, rubidium bromide, rubidium iodide, cesium chloride, cesium bromide and cesium iodide. The complex is then used in conjunction with a polar compound which does not contain reactive hydrogen.

Because of availability and cost, the complexes derived from 4,4'-methylene dianiline and sodium chloride or lithium chloride are especially preferred. In the discussion which follows reference will generally be made only to the complexes of 4,4'-methylene dianiline, but it is understood that they would apply equally as well to the complexes of racemic 2,3-di(4-aminophenyl) butane.

There are a variety of methods for preparing the complexes which are used in the instant invention in conjunction with the polar compounds.

In one method for preparing the complexes of this invention, an aqueous solution or brine containing a sodium or lithium salt selected from the group consisting of the chloride, bromide, iodide and nitrite is reacted with 4,4'-methylene dianiline (also referred to hereinafter as MDA), either in a solvent, having a degree of mutual solubility for both water and for the MDA, such as an alcohol, or with solid MDA in the substantial absence of a solvent. If the salt is present in relatively dilute concentration, for example between about 1% and about 12% by weight, a solvent for the MDA preferably is employed. If the salt is present in concentration above about 12 percent by weight, then no solvent need be employed, solid crystalline MDA being added directly to the salt solution.

A crystalline precipitate formed by interaction of the salt and the MDA is separated from the liquid phase, e.g., by filtration. The precipitate has a 3:1 mole ratio of MDA to salt and may be decomposed into its original constituents by adding a solvent such as acetone at an elevated temperature in the range of about 40° to 100°C., depending on the volatility of the solvent.

In the solvent method of preparing the complexes, a relatively dilute aqueous solution (1 to 12 percent by weight salt) of a sodium or lithium salt selected from the group comprising the chloride, bromide, iodide, and nitrite may be mixed with a solution of 4,4'-methylenedianiline in a suitable solvent, e.g., methanol, at a temperature in the range from about 20° to 60°C. Under these conditions, the MDA reacts with the sodium or lithium salt to form a crystalline precipitate consisting of MDA and the salt in a 3:1 mole ratio. The crystalline precipitate is then separated from the mother liquid by filtration, decantation, centrifuging or other suitable operation.

In the method of preparation in which a more concentrated salt solution (more than about 12 percent by weight of salt) may be employed, solid crystalline MDA is added to the salt solution with agitation at a somewhat higher temperature in the range of from about 50°C. to 90°C. in an amount somewhat in excess of the stoichiometric quantity required to react with that amount of salt which is present in excess of about 12 percent by weight. Under these conditions three mols of MDA react with one mol of salt to form a crystalline precipitate which may be separated from the remaining solution by filtration, decantation, centrifuging or other suitable operation.

Complexes of other salts, such as sodium nitrite may be formed by substantially the same procedures outlined for the sodium chloride complexes.

Generally the polar compound will make up about 0.25 to 25 weight percent, preferably 0.5 to 20 weight percent of the curing composition of complex and polar compound.

Prior to the curing operation itself, mixing and/or milling of the polyurethane with finely divided particles of the complex and the polar compound is required. Typically, the complex particle size will be between about 0.5 and 50 microns, preferably 1 to 20 microns. Grinding of the complex can be accomplished in standard grinding equipment such as the fluid energy mill and vertical hammer mills employing air classification to remove ground materials from the mill.

In mixing the complex with either fluid prepolymers or millable gums the temperature must be kept below the decomposition point of the complex in order to avoid the possibility of premature curing. In the present process the decomposition point of the complex is a function of the particular complex being used and the polymer in which the complex is dispersed. For isocyanato-terminated urethane prepolymers and the sodium chloride complex of methylene dianiline, mixing should be performed below 80°C. and preferably below about 50° to 60°C. in the absence of the polar compound. Once the polar compound and the complex are both present curing will start in most urethane systems at temperatures as low as 0°C.

The combination of complex and polar compound, referred to herein as the curing agent, should provide a minimum of 70% of the theoretical amount of active hydrogen required to react with the NCO groups contained in the polyurethane prepolymer. In making this calculation it is assumed that the methylene dianiline provided by the complex reacts with the polymer in the same way that free methylene dianiline reacts. The amount of complex employed generally should not exceed about 120% of that required in theory to react with the NCO groups of the prepolymer.

The resulting combination of polar compound and complex will generally effect a much more rapid cure of the urethane prepolymer or polymer at a given temperature and/or may be used to effect curing at a lower temperature. Typically, temperatures between about 0° to 220°C. may be utilized and preferably between about 25° and 150°C. The time for curing will vary generally between about 1 minute and 24 hours and preferably between about 5 minutes and 6 hours. Cures at ambient conditions may take place between about 5 minutes and 6 hours.

By curing isocyanate-terminated prepolymers at about ambient temperatures (15°–35°C.) with a limited amount of polar compound present, it is possible to prepare partially cured products kkown in the art as plastic gums. These materials are useful in that they may be stored for extended periods of time before being used for compression molding. This formation of plastic gum followed eventually by compression molding is known as B-stage processing in the plastics industry. The exact amount of polar compound required to prepare plastic gum depends on the polar compound and the prepolymer being used. For this particular application, lower ketones or esters are generally preferred. Acetone has been found to be very useful in preparing plastic gums, the amount required being on the order of 5 parts per 100 parts of prepolymer for typical commercial prepolymers.

It is believed that the reactions which take place in the present curing process are identical to those which occur when free MDA is used as a curing agent by prior art curing procedures.

The curing equipment and curing procedures used in the present process are conventional.

The resulting cured products may be used effectively in the molded urethane products such as automotive trim, etc.

The following examples are illustrative of the present invention and therefore are not intended in anyway as a limitation of the scope thereof. Parts and percents are by weight unless otherwise indicated.

Polymer A

Toluene —2,4-diisocyanate (348.4 parts; 2.0 mole), polytetramethyleneether glycol (no. avg. mol. wt. 1,000; 500 parts; 0.5 mole) and 1,3-butanediol (45 parts; 0.5 mole) are agitated at 80°C. for 4 hours in a dry reaction vessel protected from atmospheric moisture. Polymer A has a free NCO group content of 9.5 wt. %, a Brookfield viscosity at 30°C. of 12–15,000 cps and a no. avg. mol. wt. of about 870.

Polymer B

Toluene —2,4-diisocyanate (348.4 parts; 2.0 mole), polytetramethyleneether glycol (no. avg. mol. wt. 1,000; 750 parts; 0.75 mole and 1,3-butanediol (22.5 parts; 0.25 mole) are agitated at 80°C. for 4 hours in a dry reaction vessel protected from atmospheric moisture. Polymer B has a free NCO group content of 7.5% wt. %, a Brookfield viscosity of 7,500 cps at 30°C. and a no. avg. mol. wt. of about 750.

Curative A

A mixture of equal weights of the complex of 3 moles of methylene dianiline and 1 mole of sodium chloride (3 MDA · NaCl) and di(2-ethylhexyl) phthalate and 1.0% lecithin based on the weight of complex is ball milled for 36–48 hours to produce a dispersion of complex in which > 90% of the particles of complex have a diameter of <20 microns as determined from photomicrographs.

EXAMPLE 1

To Polymer B (50 parts) at 100°C. is added Curative A (22 parts) at room temperature and 2.5 parts of a polar compound as shown in the table below. The mixture is agitated vigorously for 2 minutes and allowed to stand at room temperature. The time required for each of the mixtures to cure to such a state that it no longer flows (no pour time) is measured.

| Polar Compound | No Pour Time |
| --- | --- |
| None | >60 min. |
| Nitrobenzene | 3.5 min. |
| Xylene | 6.0 min. |
| Chlorobenzene | 3.0 min. |

EXAMPLE 2

To Polymer A (25 parts) is added various plasticizers (2 parts) and the mixture is heated to 80°C. Micronized [tris(methylene dianiline) sodium chloride] (6 parts) is then added and the final mixture is agitated vigorously for 30 seconds. The "no pour time" is measured for the mixtures differing only the plastizer used. The results are tabulated below.

| Plasticizer | No Pour Time |
|---|---|
| Di(2-ethylhexyl)phthalate | 2.5 hours |
| Tetraethylene glycol bis-(2-ethyl hexanoate) | 4 min. |
| Dipropylene glycol dibenzoate | 25 min. |

This application is related to Caruso & Verbanc, Ser. No. 387,791, filed Aug. 13, 1973.

I claim:
1. In a process for curing an amine-curable polymer or prepolymer with a curing agent which is either
   1. a complex of 4,4'-methylene dianiline and a salt selected from the group consisting of sodium chloride, sodium bromide, sodium iodide, sodium nitrite, lithium chloride, lithium bromide, lithium iodide, lithium nitrite, and sodium cyanide, or
   2. a complex of racemic 2,3-di(4-aminophenyl) butane with a salt selected from the group consisting of sodium chloride, sodium bromide, sodium iodide, potassium chloride, potassium bromide, potassium iodide, rubidium chloride, rubidium bromide, rubidium iodide, cesium chloride, cesium bromide and cesium iodide; the ratio of said dianiline or said butane to said salt in the complex being 3 moles to 1 mole, the improvement comprising employing said curing agent in conjunction with a polar or polarizable compound having no reactive hydrogen and selected from (A) compounds having dipole moments in excess of 0.4 debye in which there are no more than a total of eight $CH_3$—, $CH_2$, or tertiary carbon radicals per polar group contained in the compound, and (B) benzene and biphenyl; said polar or polarizable compound representing about 0.25–25% by weight of the total weight of complex and polar compound.

2. The process of claim 1 wherein said curing agent is a complex of 3 moles of 4,4'-methylene dianiline and 1 mole of a salt selected from the group consisting of sodium chloride, sodium bromide, sodium iodide, sodium nitrite, lithium chloride, lithium bromide, lithium iodide, lithium nitrite and sodium cyanide.

3. The process of claim 1 wherein said prepolymer or polymer is a urethane containing free isocyanato groups.

4. The process of claim 3 wherein said complex is derived from 4,4'-methylene dianiline and sodium chloride.

5. The process of claim 3 wherein said complex is derived from 4,4'-methylene dianiline and lithium chloride.

6. The process of claim 3 wherein said polar compound (A) is selected from the group consisting of esters, ketones, ethers, halogenated hydrocarbons, tertiary amines, fully substituted amides, sulfones, sulfoxides and sulfides.

7. The process of claim 3 wherein said polar compound (A) is selected from the group consisting of esters of carboxylic acids, ketones, and halogenated hydrocarbons having a molecular weight above 1,000.

8. The process of claim 3 wherein said polar compound is a ketone.

9. The process of claim 8 wherein said ketone is acetone.

10. The process of claim 8 wherein said ketone is methyl ethyl ketone.

11. The process of claim 3 wherein said cure takes place at ambient conditions.

12. The process of claim 3 wherein said curing takes place at a temperature of about 25°–150°C.

13. A new composition of matter, a mixture of a amine-curable polymer or copolymer with
   1. a polar or polarizable compound having no reactive hydrogen and selected from (A) compounds having dipole moments in excess of 0.4 debye in which there are no more than a total of 8 $CH_3$—; —$CH_2$— or tertiary carbon radicals per polar group contained in the compound and (B) benzene and biphenyl; and
   2. a complex selected from the group consisting of (a) racemic 2,3-di (4-aminophenyl) butane and a salt selected from the group consisting of sodium chloride, sodium bromide, sodium iodide, potassium chloride, potassium bromide, potsassium iodide, rubidium chloride, rubidium bromide, rubidium iodide, cesium chloride, cesium bromide and cesium iodide, and (b) 4,4'-methylene dianiline and a salt selected from the group consisting of sodium chloride, sodium bromide, sodium iodide, sodium nitrite, lithium chloride, lithium bromide, lithium iodide, lithium nitrite and sodium cyanide, the ratio of said dianiline and said 2,3-di(4-aminophenyl) butane to said salt in said complexes being 3 moles to 1 mole;

said polar or polarizable compound representing about 0.25 to 25% by weight of the total weight of complex and polar compound.

14. The composition of claim 13 wherein said amine-curable prepolymer or polymer is a urethane prepolymer containing free isocyanate groups.

15. The composition of claim 14 wherein said polar compound (A) is selected from the group consisting of esters, ketones, ethers, halogenated hydrocarbons, tertiary amines, fully substituted amides, sulfones, sulfoxides and sulfides.

16. The composition of claim 15 wherein said polar compound is selected from the group consisting of esters of carboxylic acids, ketones and halogenated hydrocarbons having a molecular weight below 1,000.

17. The Composition of claim 16 wherein said polar compound is a ketone.

18. The composition of claim 17 wherein said ketone is acetone.

19. The composition of claim 17 wherein said ketone is methyl ethyl ketone.

20. The composition of claim 14 wherein said complex is derived from 4'4-methylene-dianiline and sodium chloride.

* * * * *